United States Patent [19]
Nishio et al.

[11] Patent Number: 5,451,742
[45] Date of Patent: Sep. 19, 1995

[54] LASER WELDING METHOD

[75] Inventors: Masahiro Nishio, Toyota; Satoshi Yasumatsu, Nagoya; Hisanori Nakamura, Toyota; Hiroaki Kobayashi, Okazaki; Hirohiko Hisano, Toyota, all of Japan

[73] Assignee: Toyota Jidosha Kabushiki Kaisha, Toyota, Japan

[21] Appl. No.: 245,607

[22] Filed: May 19, 1994

[30] Foreign Application Priority Data

May 21, 1993 [JP] Japan .................. 5-142968
Sep. 7, 1993 [JP] Japan .................. 5-246296

[51] Int. Cl.⁶ .............................. B23K 26/00
[52] U.S. Cl. ................................. 219/121.64
[58] Field of Search ............... 219/121.63, 121.64

[56] References Cited

U.S. PATENT DOCUMENTS

| | | | |
|---|---|---|---|
| 4,654,505 | 3/1987 | Sciaky et al. | 219/121.63 |
| 4,661,677 | 4/1987 | La Rocca | 219/121.64 |
| 4,873,415 | 10/1989 | Johnson et al. | 219/121.64 |
| 4,916,284 | 4/1990 | Petrick | 219/121.64 |
| 4,973,817 | 11/1990 | Kanno et al. | 219/121.63 |
| 5,104,032 | 4/1992 | Spies et al. | 219/121.64 |
| 5,115,115 | 5/1992 | Alborante | 219/121.64 |
| 5,125,780 | 6/1992 | Budenbender | 219/121.64 |
| 5,131,710 | 7/1992 | Kamiguchi et al. | 219/121.64 |
| 5,283,415 | 2/1994 | Nishi et al. | 219/121.64 |

FOREIGN PATENT DOCUMENTS

| | | |
|---|---|---|
| 0010610 | 5/1980 | European Pat. Off. . |
| 0136190 | 4/1985 | European Pat. Off. . |
| 3820848 | 4/1989 | Germany . |
| 4240824 | 1/1994 | Germany . |
| 59-30492 | 2/1984 | Japan .................. 219/121.64 |
| 60-130462 | 7/1985 | Japan . |
| 60-148691 | 8/1985 | Japan . |
| 61-119393 | 6/1986 | Japan . |
| 63-273583 | 11/1988 | Japan . |
| 1202387 | 8/1989 | Japan . |
| 5-27767 | 10/1993 | Japan .................. 219/121.64 |

OTHER PUBLICATIONS

"Nikkei Mechanical"—published May 3, 1993—pp. 16-20.

*Primary Examiner*—Geoffrey S. Evans
*Attorney, Agent, or Firm*—Cushman, Darby & Cushman

[57] ABSTRACT

A YAG laser welding is applied to a panel assembly including an outer panel and an inner panel manufactured of, for example, aluminum alloy. The YAG laser welding is conducted by any one of (1) emitting one pulse of a YAG laser onto the panel assembly to laser-weld the panel assembly in the manner of spot welding, (2) providing an outer panel having a slit between portions of the outer panel where weld beads are formed, (3) laser-welding the panel assembly using a first YAG laser having a first laser output and a second YAG laser having a second, lower laser output intermittently along a welding schedule line, and (4) laser-welding the panel assembly on a line of the panel assembly increased in bending rigidity due to a hemming curvature.

23 Claims, 5 Drawing Sheets

LASER WELDING METHOD

BACKGROUND OF THE INVENTION

1. Field of the Invention

The present invention relates to a laser welding method which can be used for laser-welding aluminum alloy parts.

2. Description of the Prior Art

As one example of manufacturing automobile parts of aluminum alloy, the manufacture of aluminum alloy automobile hoods is taken. In the manufacture, an inner panel having a peripheral portion and an outer panel having a hemmed portion are welded at the hemmed portion. If a conventional pressure-type spot welding is applied, the hemmed portion will be seriously deformed under the pressurizing forces from welding tips. This means that it is not desirable to use the conventional spot welding for welding aluminum alloy parts. In place of conventional spot welding, MIG welding or TIG welding could be used. However, because the thermal conductivity and the thermal expansion rate of the aluminum alloy are much greater than those of steel, relatively large deformations will be generated in the weld deposits and the heat-affected zone, and will need repair after welding.

To suppress deformation, the utility of laser welding of aluminum alloy parts is being investigated. For example, Publication, "NIKKEI MECHANICAL" published on May 3, 1993 from NIKKEI BP Company Ltd. discloses the application of laser welding to automobile hoods. In the laser welding, a Yttrium-Aluminum-Garnet (hereinafter, YAG) laser is used and is transmitted from a laser generator to a laser torch via optical fibers. The laser torch is moved along a welding schedule line to make intermittent weld beads each having a length of about 20 mm. The reason for using a YAG laser is that a YAG laser has a wave length of 1.06 micron and is almost not absorbed by the optical fibers constructed of $SiO_2$.

However, with the above-described intermittent weld beads there is a problem that the thermal expansion and shrinkage caused in the weld beads and heat-affected zone thereof are relatively large so that relatively large deformations are still caused in the welding portion of the parts.

SUMMARY OF THE INVENTION

An object of the invention is to provide a laser welding method which can suppress deformation or distortion generated in a panel assembly during laser-welding.

In accordance with the present invention, the above-described object can be achieved by any one of the following methods:

(1) laser-welding a panel assembly so that spot-like weld beads spaced from each other are formed;

(2) providing a slit in a panel assembly beforehand between portions to be laser-welded, and then conducting laser-welding;

(3) alternatingly conducting a first laser welding with a relatively large laser output and a second laser welding with a relatively small laser output intermittently along a welding schedule line so that the second laser welding offsets the thermal stressed caused by the first laser welding; and (4) applying laser-welding onto a portion of a panel assembly increased in bending rigidity due to the hemming curvature of a folded over portion of the panel assembly.

Figure 1:
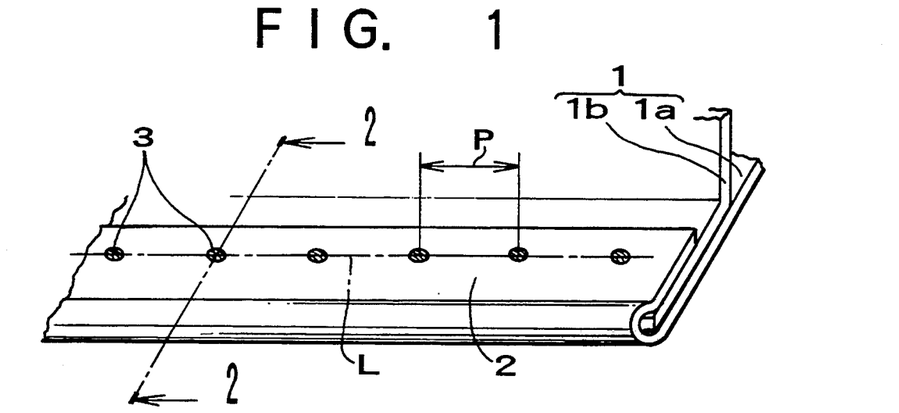
FIG. 1 is an oblique view of a panel assembly to which a laser welding method accordance with a first embodiment of the invention is applied.
Figure 2:
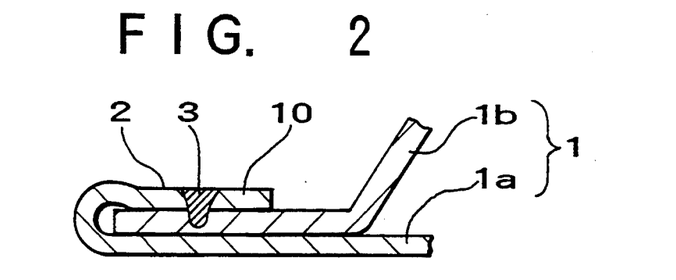
FIG. 2 is cross-sectional view of the panel assembly taken along line 2—2 in FIG. 1, and is applicable to any one of other embodiments of the invention.
Figure 13:
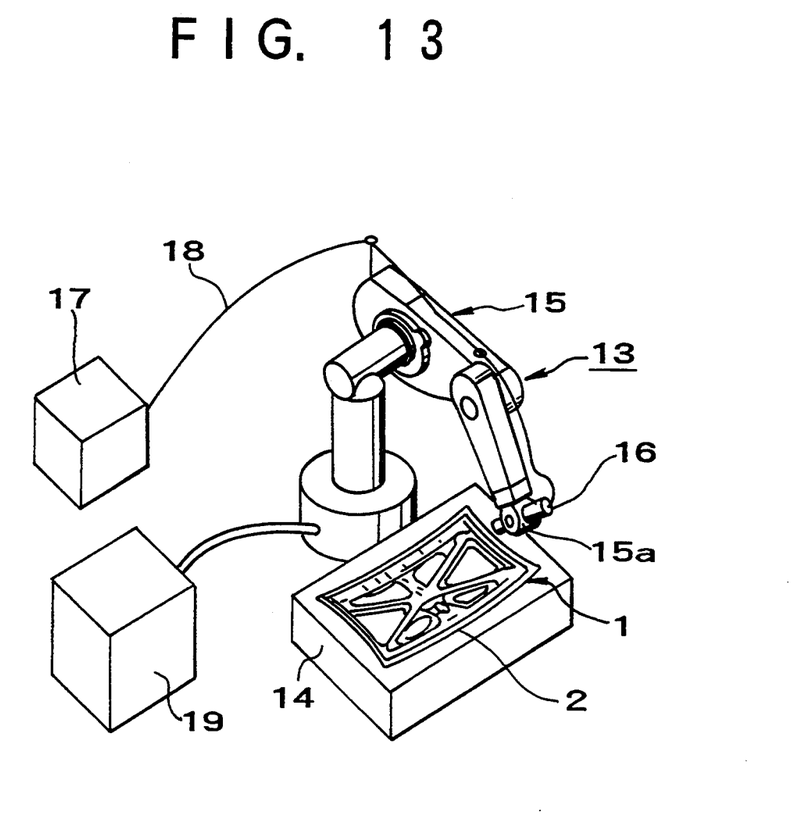
FIG. 13 is an oblique view of a YAG laser welding apparatus used in conducting a laser welding method in accordance with an embodiment of the present invention.

The method of (1) will be illustrated as a first embodiment of the invention using FIGS. 1, 2, and 13.

The method of (2) will be illustrated as second to sixth embodiments of the invention using FIGS. 3 to 7, and 13.

Figure 8:
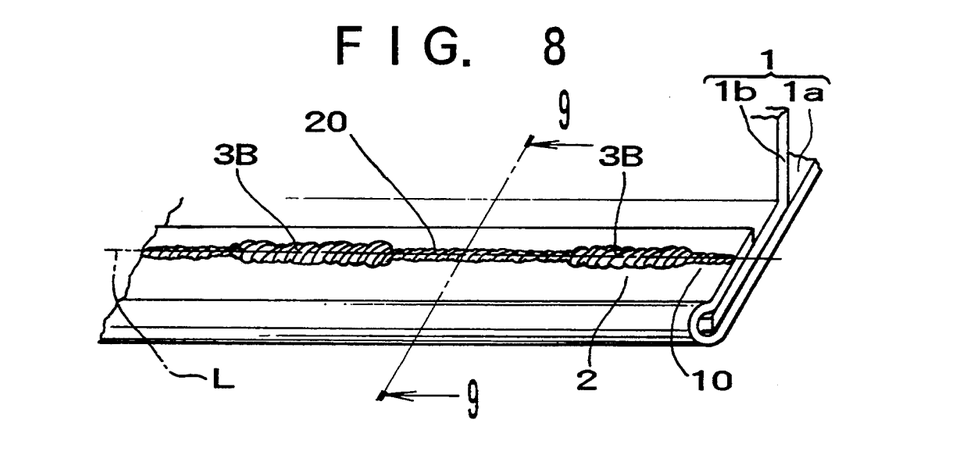
FIG. 8 is an oblique view of a panel assembly to which a laser welding method in accordance with a seventh embodiment of the invention is applied.
Figure 9:
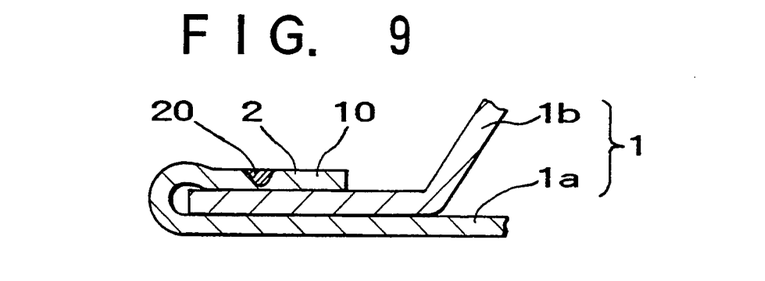
FIG. 9 is a cross-sectional view of the panel assembly taken along line 9—9 in FIG. 8.

The method of (3) will be illustrated as a seventh embodiment of the invention using FIGS. 8 and 9, and 13.

The method of (4) will be illustrated as an eighth embodiment of the invention using FIGS. 10 to 12, and 13.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

FIG. 13 illustrates a laser welding apparatus 13 which can be used for performing a laser welding in accordance with the present invention, and a panel assembly 1 which is to be laser welded. The panel assembly is also shown in FIG. 2. The panel assembly 1 is, for example, an automobile bonnet panel assembly 1 constructed of aluminum alloy, though the panel assembly is not limited to a automobile boad. The panel assembly includes an inner panel 1b having a peripheral portion and an outer panel 1a having a folded over hemmed portion in which the peripheral portion of the inner panel 1b is held. The hemmed portion of the outer panel 1a and the peripheral portion of the inner panel 1b define a three plate overlapping portion of the panel assembly 1. In the case of an automobile boad, a thickness of the outer panel 1a is about 1 mm and a thickness of the inner panel 1b is about 1.4 mm. The laser welding is applied to the three plate overlapping portion of the panel assembly 1. A weld bead 3 is formed only between the two plates located on the laser emission side and does not reach the third plate farthest from the laser emission side in order to suppress distortion generated in the hemmed portion of the panel assembly 1 due to expansion and shrinkage of the weld beads and the heat-affected zones.

In FIG. 13, the panel assembly 1 is set at a predetermined position on a table 14. A multi-arm robot 15 is disposed in the vicinity of the table 14. A laser torch 16 is coupled to a tip or wrist portion 15a of the robot 15 and is moved by the robot 15 along a welding schedule line L (see, for example, FIG. 1). The laser torch 16 is connected to a pulse YAG laser generator 17 via optical fibers 18 so that a pulse YAG laser is transmitted from the YAG laser generator 17 to the laser torch 16. Operation of the robot 14 is controlled by a robot controller 19 so that the laser torch 16 is relatively moved along the welding schedule line L at a predetermined speed and the laser beam issued from the laser torch 16 is directed toward a portion of the panel assembly 1 to be welded.

When a pulse YAG laser is used for the laser welding, it is preferable that the average laser output be set at 500–700 watt, that the pulse width is set at 10–20 msec, and that a pulse repetition frequency is set at 6–10 Hz. Preferably, the laser torch 16 is moved relative to the panel assembly 1 at a speed of 50–150 mm/sec. More preferably, the laser welding is conducted such that the thickness of the outer panel 1a is about 1 mm, that the thickness of the inner panel is about 1.4 mm, that the laser output power is set at about 650 watt, that the pulse width is set about 18 msec, that the pulse repetition is about 6 Hz, and that the welding speed is about 90 mm/sec.

Methods specific to each embodiment of the invention will now be explained. FIGS. 1 and 2 illustrate a panel assembly 1 which has been laser-welded using a laser welding method in accordance with a first embodiment of the invention. The laser welding method in accordance with the first embodiment of the invention includes repetition of the steps of (a) emitting one pulse of a YAG laser from the pulse YAG laser torch 16 onto the panel assembly 1 to laser-weld the panel assembly 1 in a spot-welding manner, and (b) moving one of the laser torch 16 and the panel assembly 1 relative to the other by a predetermined distance while stopping emission of a laser beam from the laser torch 16. The distance is predetermined so that spot weld beads 3 are spaced from each other at a pitch of about 15 mm or greater. The reason for the pitch of 15 mm or greater is to prevent the spot weld beads 3 from affecting each other in thermal distortion and significantly deforming the panel assembly 1. If the pitch is nearly equal to 15 mm, the welding strength between the outer panel 1a and the inner panel 1b is desirably great so that strength and rigidity of the bonnet are assured. Preferably, the size of each spot weld bead 3 is equal to or less than 6 mm in a direction along the welding schedule line. The size of each spot weld bead 3 changes according to the laser output and the speed of the laser torch 16. During the step of emitting one pulse of laser, one of the laser torch 16 and the panel assembly 1 may be either moved or stopped relative to the other.

When the YAG laser output is about 650 watt, the pulse width is about 18 msec, the pulse repetition frequency is about 6 Hz, and the speed of the laser torch is about 90 mm/sec, the pitch of about 15 mm is thereby obtained.

Figure 3:
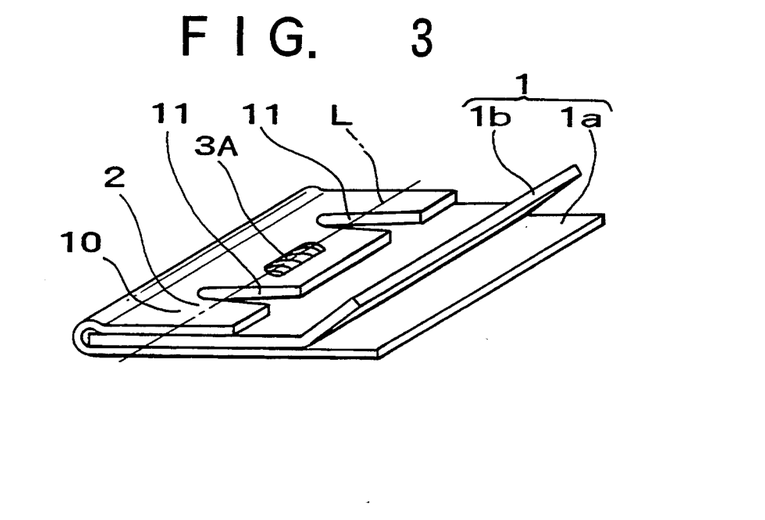
FIG. 3 is an oblique view of a panel assembly to which a laser welding in accordance with a second embodiment of the invention is applied.

FIG. 3 illustrates the panel assembly 1 manufactured of aluminum alloy to which a laser welding method in accordance with a second embodiment of the invention has been applied. The panel assembly 1 includes the inner panel 1b having a peripheral portion and the outer panel 1a having a hemmed portion 2 in which the peripheral portion of the inner panel 1b is held. In a folded-back portion 10 of the outer panel 1a, a plurality of slits 11 extending adjacent to a periphery of the outer panel 1a are formed before laser welding is conducted. Each slit 11 is preferably a V-shaped slit but may have other forms. Then, the panel assembly 1 is laser-welded intermittently along the welding schedule line L using the welding apparatus of FIG. 13 so that a weld bead 3A continuing for a certain length along the welding schedule line L is formed and the slit 11 is located in the vicinity of each longitudinal end of the weld bead 3A. An extention of the weld bead 3A and a center line of the slit 11 are ideally substantially perpendicular to each other. In this way, adjacent two weld beads 3A are separated from a slit 11 (or slits 11) located between the adjacent two weld beads 3A.

The length of each of the weld beads 3A is preferably about 10–20 mm. When a pulse YAG laser apparatus is used to form the weld bead 3A having a length of 10–20 mm, a number of pulses per one weld bead 3A is 15–20 when the welding torch 16 is moved relative to the panel assembly 1 at a speed of about 90 mm/sec. The laser output level is, for example, 500–700 watt. The weld bead 3A may also be formed using a continuous wave (CW) YAG laser apparatus which is intermittently operated. Since the length of the weld bead 3A is about 10–20 mm, the weld bead 3A will not cause a large thermal deformation. Thermal shrinkages of the weld beads 3A and tensile stresses generated in the panel assembly 1 due to the thermal shrinkages will be absorbed by the slit 11 provided between adjacent two weld beads 3A, so that large deformations do not occur in the weld beads 3A and the panel assembly 1. Further, the weld bead 3A is formed only in two of the three plates of the three plate overlapping portion located on the laser emission side in a thickness direction of the panel assembly 1. Thermal deformation is therefore further suppressed.

The above-described slit 11 may be replaced by other types of slits.

Figure 4:
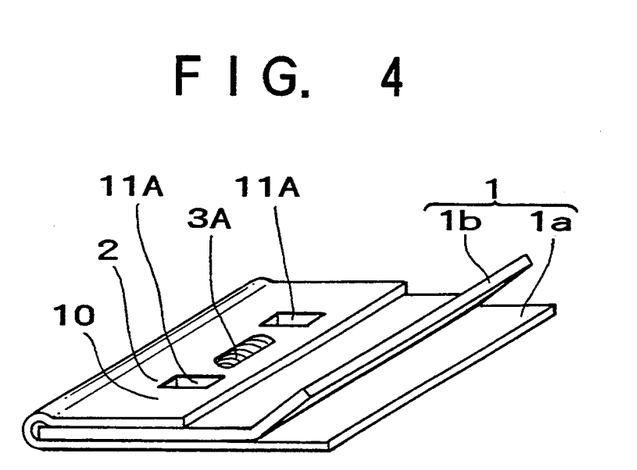
FIG. 4 is n oblique view of a panel assembly to which a laser weld g method in accordance with a third embodiment of the invention is applied.

More particularly, FIG. 4 illustrates a closed slit 11A made in the folded-back portion 10 of the outer panel 1a of the panel assembly 1 used in accordance with a third embodiment of the invention. The slit 11A extends perpendicularly to the welding schedule line L on opposite sides of a portion of the outer panel to be laser-welded in a direction along the welding schedule line L. The slit 11a ends at a position spaced from a periphery of the outer panel 1a in the direction perpendicular to the welding schedule line L.

Figure 5:
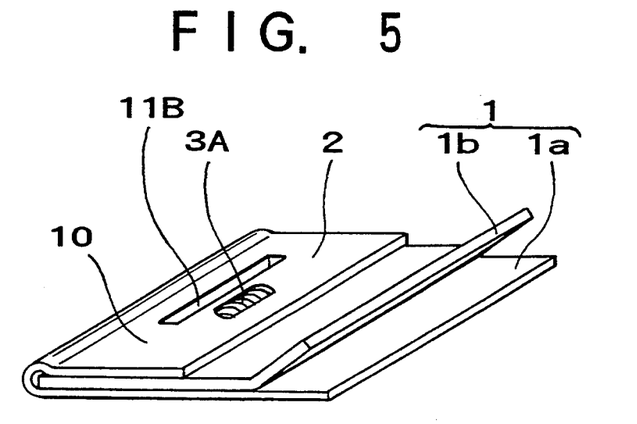
FIG. 5 is an oblique view of a panel assembly to which a laser welding method in accordance with a fourth embodiment of the invention is applied.

FIG. 5 illustrates a closed slit 11B made in the folded-back portion 10 of the outer panel 1a of the panel assembly 1 used in accordance with a fourth embodiment of the invention. The slit 11B extends in parallel with the welding schedule line L on one side of the welding schedule line L. The slit 11B is located at a position farther from a periphery of the outer panel 1a than the welding schedule line L. The slit 11B may preferably extend longer than the weld bead 3A in a longitudinal direction parallel to the welding schedule line L.

Figure 6:
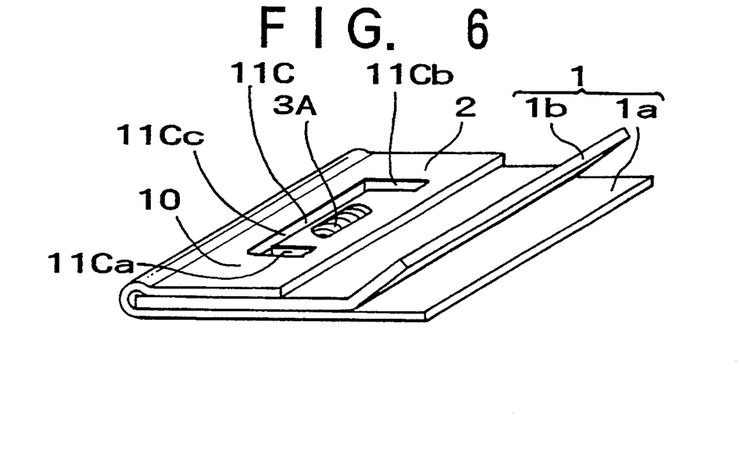
FIG. 6 is an oblique view of a panel assembly to which a laser welding method in accordance with a fifth embodiment of the invention is applied.

FIG. 6 illustrates a composite slit 11C made in the folded-back portion 10 of the outer panel 1a of the panel assembly 1 used in accordance with a fifth embodiment of the invention. The composite slit 11C includes a first slit portion 11Ca and a second slit portion 11Cb and a third slit portion 11Cc connecting the first and second slit portions 11Ca and 11Cb. The first and second slit portions 11Ca and 11Cb are located on opposite sides of a portion of the outer panel 1a where weld bead 3A is formed and extend perpendicularly to the welding schedule line L. The third slit portion 11Cc extends in parallel with the welding schedule line L and is located on one side of the welding schedule line L. The third slit portion 11Cc is located at a position farther from a periphery of the outer panel 1a than the weld bead 3A.

Figure 7:
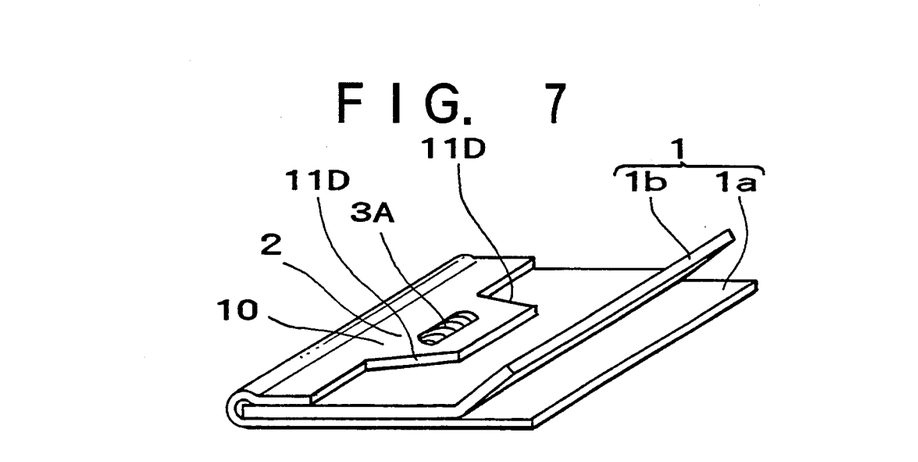
FIG. 7 is an oblique view of a panel assembly to which a laser welding method in accordance with a sixth embodiment of the invention is applied.

FIG. 7 illustrates a wide slit (or a recess) 11D made in the edge of folded-back portion 10 of the outer panel 1a of the panel assembly 1 used in accordance with a sixth embodiment of the invention. The wide slit 11d is recessed from a periphery of the outer panel 1a in a widthwise direction perpendicular to the welding schedule line L. The wide slit 11d is located between adjacent two portions of the outer panel 1a where weld beads 3A are to be formed.

The other details of the third through sixth embodiments of the invention are the same as those of the second embodiment of the invention.

FIGS. 8 and 9 illustrate the panel assembly 1 laser-welded using a laser welding method in accordance with a seventh embodiment of the invention. The panel assembly 1 includes the inner panel 1b having a peripheral portion and the outer panel 1a having a hemmed portion 2 in which the peripheral portion of the inner panel 1b is held. The hemmed portion 2 of the outer panel 1a and the peripheral portion of the inner panel 1b constitute a three plate overlapping portion. The laser welding is applied to the three plate overlapping portion. The laser welding method in accordance with the seventh embodiment of the invention includes repetition of the steps of (a) laser-welding the panel assembly 1 using a YAG laser at a first laser power output level, so that a first weld bead 3B is formed in both the folded-back portion 10 of the outer panel 1a and the inner panel 1b in a thickness direction of the panel assembly 1 and which extends continuously for a first length in a direction along the welding schedule line L, and then (b) laser-welding the panel assembly 1 using a YAG laser at a second laser power output level which is lower than the first laser power output level, so that a second weld bead 20 is formed in only the folded-back portion 10 of the outer panel 1a in the thickness direction of the panel assembly 1 and which extends continuously for a second length from an end of the first weld bead 3B in a direction away from the first weld bead 3B along the welding schedule line L. The first weld beads 3B and the second weld beads 20 are formed alternately along the welding schedule line L (as seen in FIGS. 8 and 9).

In the thus laser-welded panel assembly 1, though the first weld beads 3B cause tensile stresses acting in a first direction in the panel assembly 1 when the first weld beads 3B shrink, the second weld beads 20 will cause tensile stresses acting in a second direction opposite to the first direction to counterbalance the tensile stresses generated by the first weld beads 3B when the second weld beads 20 shrink. Thus, deformation or distortion of the hemmed portion 2 of the panel assembly 1 due to laser welding is suppressed.

Figure 10:
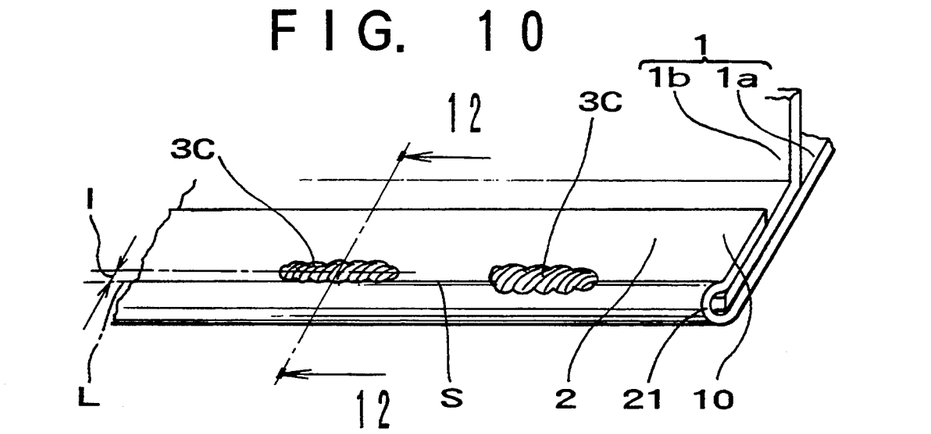
FIG. 10 is an oblique view of a panel assembly to which a laser welding method in accordance with an eighth embodiment of the invention is applied.
Figure 11:
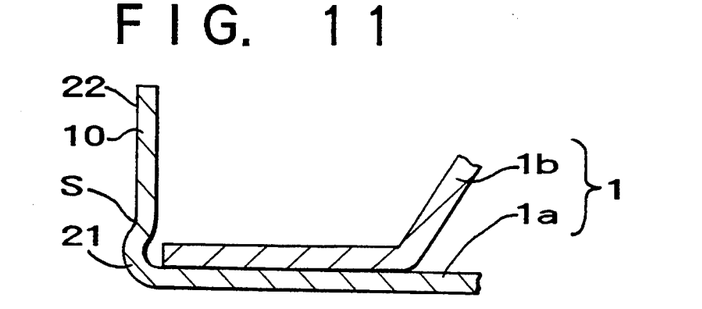
FIG. 11 is a side view of the panel assembly of FIG. 10 before the laser welding is applied.
Figure 12:
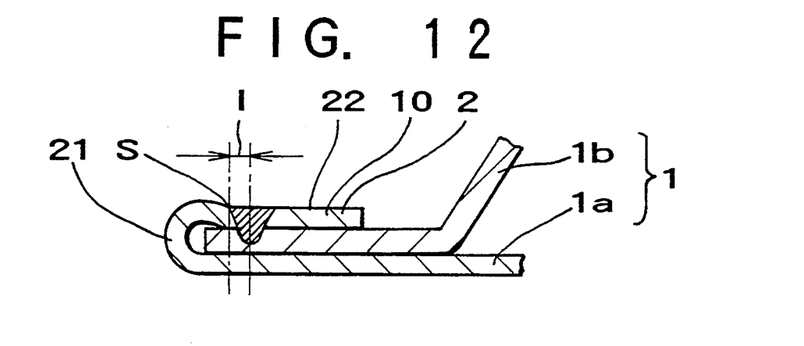
FIG. 12 is a cross-sectional view of the panel assembly taken along line 12—12 in FIG. 10.

FIGS. 10 to 12 illustrate the panel assembly 1 laser-welded using a laser welding method in accordance with an eighth embodiment of the present invention. The panel assembly 1 includes the inner panel 1b having a peripheral portion and the outer panel 1a having a hemmed portion 2 in which the peripheral portion of the inner panel 1b is held. The inner panel 1b and the hemmed portion 2 of the outer panel 1a define a three plate overlapping portion of the panel assembly 1 to which YAG laser welding is applied. A portion 21 where the outer panel 1a is bent during hemming is pre-formed to the shape of an arc in cross section before heming as shown in FIG. 11 so that the outer panel 1a is smoothly bent during hemming. The arc cross-sectional portion 21 and a flat portion 22 of the outer panel 1a defines an intersection S between them. The laser welding method in accordance with the eighth embodiment of the invention is applied to the intersection S or a portion of the panel assembly 1 located in the vicinity of the intersection S so that a continuous or an intermittent weld bead 3C is formed on the intersection S or in the vicinity of and along the intersection S. When the weld bead 3C is formed at a position close to but spaced from the intersection S, a distance (1) between a center line of the weld bead 3C and the intersection S is preferably no greater than about 3 mm.

Since the intersection S or the portion of the panel assembly located adjacent to the intersection S has a comparatively large bending rigidity due to the curvature of the arc portion 21, deformation or distortion caused due to the laser welding is suppressed by the large bending rigidity of the intersection S.

Any embodiment of the present invention can be applied to a panel assembly manufactured of not only aluminum alloy but also other materials, for example, steel, copper, and magnesium. The panel assembly is not limited to an automobile bonnet, and can be applied to other parts or assemblies. The portion to which the laser welding method is applied is not limited to a hemmed portion and can be applied to, for example, a flange portion and a double or plural plate overlapping portion. An apparatus to which the laser torch 13 is coupled is not limited to a multi-arm robot 12 and may be a head moved in a single direction or in X-Y directions. Spot or intermittent welding according to the present invention may be used, combined with the conventional continuous wave laser welding.

In accordance with the present invention, an advantage that deformation or distortion generated in a panel assembly due to laser-welding can be suppressed is realized.

Although only several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A laser welding method comprising repetition of the following steps of:
    directing one pulse of a YAG laser from a pulse YAG laser torch onto a panel assembly to laser-weld the panel assembly by forming a spot weld, wherein during said step of directing one laser pulse, at least one of the laser torch and the panel assembly is being moved relative to the other; and
    moving the laser torch and the panel assembly relative to one another while the laser torch emission is not being directed onto said panel assembly.

2. A laser welding method according to claim 1, wherein the laser torch and the panel assembly are moved relative to one another such that a resultant plurality of spot weld beads are spaced from each other at a pitch of about 15 mm or greater.

3. A laser welding method according to claim 1, wherein each spot weld bead is no greater than about 6 mm when measured in a direction in which the laser torch and the panel assembly are moved relative to one another.

4. A laser welding method comprising the following steps of:
    providing a panel assembly having at least one slit adjacent to a portion of the panel assembly where a weld bead is subsequently formed, wherein the panel assembly includes an inner panel having a peripheral portion and an outer panel having a hemmed portion in which the peripheral portion of the inner panel is disposed, the hemmed portion including a folded-back portion, and wherein said slit is made in the folded-back portion of the outer panel; and
    laser-welding the panel assembly using a laser to form the weld bead such that a plurality of weld beads extend intermittently adjacent to the at least one slit.

5. A laser welding method according to claim 4, wherein said laser welding is conducted using a pulse YAG laser.

6. A laser welding method according to claim 5, wherein said laser welding step comprises emitting 15-20 laser pulses to form a weld bead, wherein a length of each weld bead is 10-20 mm.

7. A laser welding method according to claim 4, wherein said laser welding is conducted using a continuous wave YAG laser.

8. A laser welding method according to claim 4, wherein the at least one slit comprises an open slit made on each longitudinal side of the portion of the panel assembly where a weld bead is subsequently formed.

9. A laser welding method according to claim 4, wherein the at least one slit comprises any one of a closed slit made on each longitudinal side of the portion of the panel assembly where a weld bead is subsequently formed and a closed slit made on one transverse side of the portion of the panel assembly.

10. A laser welding method according to claim 4, wherein said slit comprises first and second slit portions made on opposite longitudinal sides of the portion of the panel assembly where a weld bead is subsequently formed and a third slit portion which connects the first slit portion and the second slit portion and extends substantially in parallel with said portion where a weld bead is subsequently formed.

11. A laser welding method according to claim 4, wherein said slit comprises a recess formed between adjacent portions where weld beads are subsequently formed.

12. A laser welding method comprising repetition of the following steps of:
    laser-welding a panel assembly which includes an inner panel having a peripheral portion and an outer panel having a hemmed portion in which the peripheral portion of the inner panel is disposed, using a YAG laser at a first laser output level, so that a first weld bead is formed in both a folded-back portion of the outer panel and the peripheral portion of the inner panel with respect to a thickness direction of the panel assembly and which extends continuously for a first length in a direction along a welding schedule line; and
    laser-welding the panel assembly using a laser at a second laser output level so that a second weld bead is formed in only the folded-back portion of the outer panel with respect to the thickness direction of the panel assembly and which extends continuously from an end of the first weld bead in a direction away from the first weld bead along the welding schedule line.

13. A laser welding method comprising the following steps of:
    providing a panel assembly including an inner panel having a peripheral portion and an outer panel having a folded-over hemmed portion in which the peripheral portion of the inner panel is disposed, a portion of the outer panel at which the outer panel is folded over during hemming being pre-formed in the form of an arc in transverse cross section so that a line is formed at an intersection of the arc portion and a remaining flat portion of the outer panel; and
    laser-welding the panel assembly continuously or intermittently on said line, or along but close to said line.

14. A laser welding method comprising repetition of the following steps of:
    directing a single pulse of a YAG laser from a pulse YAG laser torch onto a panel assembly to laser-weld the panel assembly by forming a spot weld; and
    moving the laser torch and the panel assembly relative to one another while the laser torch emission is not being directed onto said panel assembly.

15. A laser welding method according to claim 14, wherein the laser torch and the panel assembly are moved relative to one another such that a resultant plurality of spot weld beads are spaced from each other at a pitch of about 15 mm or greater.

16. A laser welding method according to claim 14, wherein during said step of directing a single laser pulse, at least one of the laser torch and the panel assembly is moved relative to the other.

17. A laser welding method according to claim 14, wherein during said step of directing a single pulse of laser, the laser torch and the panel assembly are motionless relative to one another.

18. A laser welding method according to claim 14, wherein each spot weld bead is no greater than about 6 mm when measured in a direction in which the laser torch and the panel assembly are moved relative to one another.

19. A laser welding method according to any one of claims 1, 4, 12, 13, and 14, wherein the panel assembly includes a three plate overlapping portion, and a laser output level is selected such that a weld bead is formed only in the upper two plates of the three plate overlapping portion nearest to the laser emission side with respect to a thickness direction of the panel assembly.

20. A laser welding method according to any one of claims 1, 4, 12, 13, and 14, wherein the panel assembly is an automobile bonnet constructed of aluminum alloy.

21. A laser welding method according to any one of claims 1, 4, 12, 13, and 14, wherein the pulse laser welding is conducted keeping an average laser output level of the pulse laser welding at 500–700 watt, a pulse width of the pulse laser welding at 10–20 msec, and a pulse repetition frequency of the pulse laser welding at 6–10 Hz.

22. A laser welding method according to any one of claims 1, 4, 12, 13, and 14, wherein a laser torch is coupled to a wrist element of a welding robot which is controlled by a robot controller so that the laser torch is moved relative to to the panel assembly at a speed of 50–150 mm/sec.

23. A laser welding method according to claim 21, wherein said laser welding is conducted under conditions that a thickness of the outer panel is about 1 mm, that a thickness of the inner panel is about 1.4 mm, that a laser output is about 650 watt, that a pulse width is about 18 msec, that a pulse repetition frequency is about 6 Hz, and that a welding speed is about 90 mm/sec.

* * * * *